US012669654B2

(12) United States Patent
Cheng

(10) Patent No.: US 12,669,654 B2
(45) Date of Patent: Jun. 30, 2026

(54) OPTICAL COUPLING STRUCTURE AND METHOD FOR MANUFACTURING THE SAME, AND OPTICAL COMMUNICATION SYSTEM

(71) Applicant: ENKRIS SEMICONDUCTOR, INC., Suzhou (CN)

(72) Inventor: Kai Cheng, Suzhou (CN)

(73) Assignee: ENKRIS SEMICONDUCTOR, INC., Suzhou (CN)

( * ) Notice: Subject to any disclaimer, the term of this patent is extended or adjusted under 35 U.S.C. 154(b) by 316 days.

(21) Appl. No.: 18/630,942

(22) Filed: Apr. 9, 2024

(65) Prior Publication Data

US 2025/0116821 A1     Apr. 10, 2025

(30) Foreign Application Priority Data

Oct. 7, 2023     (CN) .......................... 202311286532.1

(51) Int. Cl.
*G02B 6/36* (2006.01)

(52) U.S. Cl.
CPC ......... *G02B 6/3644* (2013.01); *G02B 6/3652* (2013.01)

(58) Field of Classification Search
CPC ..... G02B 6/421; G02B 6/3644; G02B 6/3652
See application file for complete search history.

(56) References Cited

U.S. PATENT DOCUMENTS

2010/0265983 A1* 10/2010 Adachi ..................... H01S 5/18
                                                         372/50.23
2013/0308906 A1* 11/2013 Zheng .................. G02B 6/4214
                                                         29/592
2018/0008123 A1*  1/2018 Iwaisako .................. A61B 1/04

* cited by examiner

*Primary Examiner* — Michael P Mooney
(74) *Attorney, Agent, or Firm* — Westbridge IP LLC

(57) ABSTRACT

An optical coupling structure includes an alignment layer, a growth substrate and an optical functional layer, the growth substrate being used for epitaxially manufacturing the optical functional layer, and the optical functional layer being aligned with a first through hole in the growth substrate; an optical fiber input end disposed in a second through hole in the alignment layer for improving stability of the optical fiber input end; and an embedding structure used to penetrate through the first and second through holes, which may not only clamp and fix the alignment layer and the growth substrate, effectively improving overall stability of the optical coupling structure, but also align the optical functional layer with the optical fiber input end, and therefore, light emitting from the optical functional layer directly enters the optical fiber input end through the first and second through holes, improving an optical coupling efficiency.

20 Claims, 8 Drawing Sheets

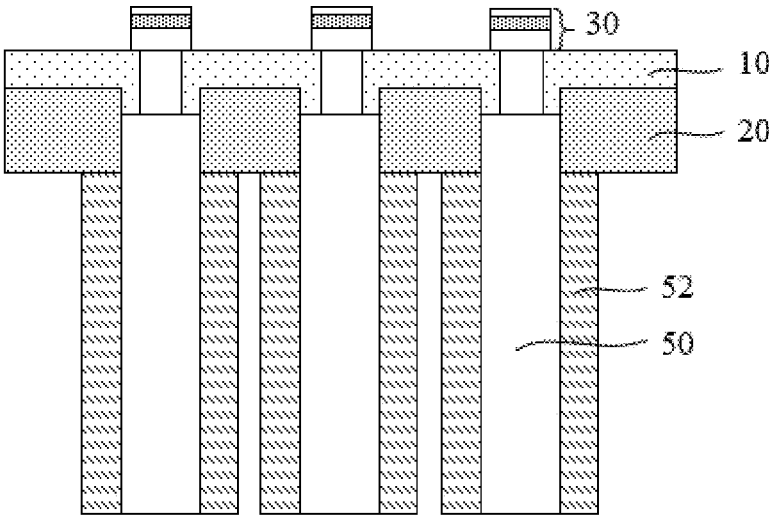

FIG. 15

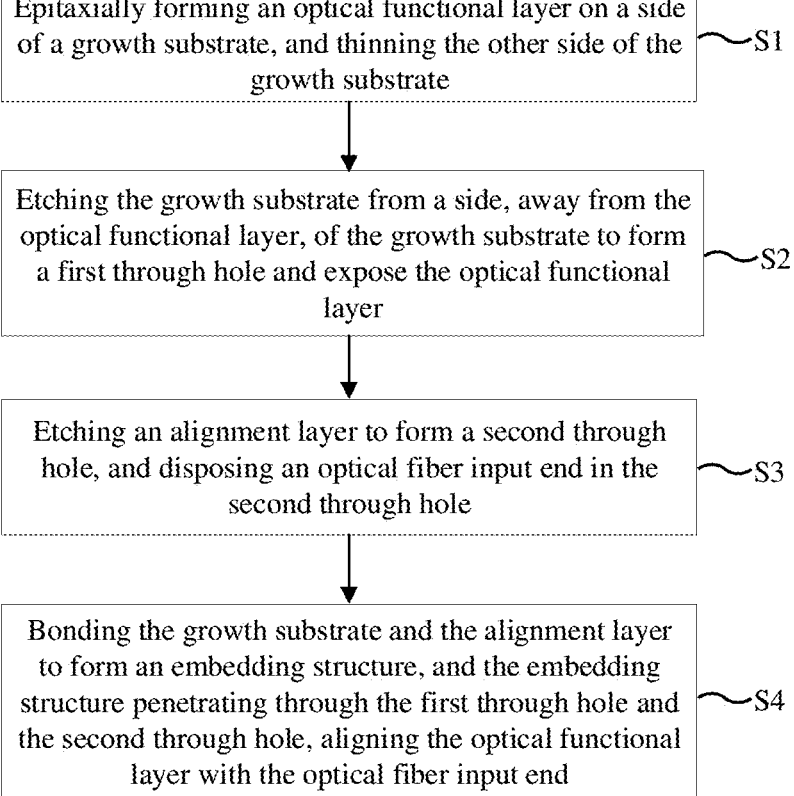

Epitaxially forming an optical functional layer on a side of a growth substrate, and thinning the other side of the growth substrate ~S1

Etching the growth substrate from a side, away from the optical functional layer, of the growth substrate to form a first through hole and expose the optical functional layer ~S2

Etching an alignment layer to form a second through hole, and disposing an optical fiber input end in the second through hole ~S3

Bonding the growth substrate and the alignment layer to form an embedding structure, and the embedding structure penetrating through the first through hole and the second through hole, aligning the optical functional layer with the optical fiber input end ~S4

FIG. 16

OPTICAL COUPLING STRUCTURE AND METHOD FOR MANUFACTURING THE SAME, AND OPTICAL COMMUNICATION SYSTEM

CROSS-REFERENCE TO RELATED APPLICATIONS

The present application claims priority to Chinese Patent Application 202311286532.1, filed on Oct. 7, 2023, the content of which is incorporated herein by reference in its entirety.

TECHNICAL FIELD

The present application relates to the field of optical communication technologies, and in particular, to an optical coupling structure and a method for manufacturing the same, and an optical communication system.

BACKGROUND

Active optical cables (AOCs) are commonly used as signal transmission equipment, which are generally used for high-speed and high-reliability interconnection among equipment such as a data center, a high-performance computer or a large-capacity memory, and are usually composed of an integrated photoelectric device and an optical fiber. A light source used in the AOCs is generally a semiconductor laser, such as a vertical cavity surface emitting laser (VCSEL) or a distributed feedback (DFB) laser that is edge emitted. The semiconductor laser needs to operate above its threshold current to function properly, which requires a relatively high power consumption, and has a reliability risk under a high-temperature condition. In contrast, when a Micro LED is used as a light source, the Micro LED can emit light under spontaneous radiation, is small in size and low in power consumption, and can have a longer life under a high-temperature condition.

However, at present, there are no mature schemes for coupling a Micro LED array to an optical fiber in the industry. Therefore, it is necessary to seek an optical coupling structure to improve an optical coupling efficiency.

SUMMARY

In view of this, embodiments of the present application provide an optical coupling structure and a method for manufacturing the same, and an optical communication system, so as to solve technical problems of a relatively low optical coupling efficiency in related technologies.

According to a first aspect, embodiments of the present application provide an optical coupling structure, including: an alignment layer, a growth substrate and an optical functional layer which are stacked sequentially, the growth substrate being used for epitaxially manufacturing the optical functional layer, the growth substrate including a first through hole, the optical functional layer being aligned with the first through hole, and the alignment layer including a second through hole; an optical fiber input end disposed in the second through hole; and an embedding structure disposed at openings, facing each other, of the first through hole and the second through hole, and a material surrounding one of the first through hole and the second through hole being embedded into the other of the first through hole and the second through hole, connecting the first through hole and the second through hole in series.

According to another aspect, embodiments of the present application provide a method for manufacturing an optical coupling structure, the method for manufacturing the optical coupling structure includes: epitaxially forming an optical functional layer on a side of a growth substrate, and thinning the other side of the growth substrate; etching the growth substrate from a side, away from the optical functional layer, of the growth substrate to form a first through hole and expose the optical functional layer; etching an alignment layer to form a second through hole, and disposing an optical fiber input end in the second through hole; and bonding the growth substrate and the alignment layer to form an embedding structure, and the embedding structure penetrating through the first through hole and the second through hole, aligning the optical functional layer with the optical fiber input end.

According to yet another aspect, embodiments of the present application provide an optical communication system, including the above optical coupling structure.

BRIEF DESCRIPTION OF DRAWINGS

FIG. 15 is a schematic diagram of another optical coupling structure according to an embodiment of the present application.

FIG. 16 is a flowchart of a method for manufacturing an optical coupling structure according to an embodiment of the present application.

DETAILED DESCRIPTION OF THE EMBODIMENTS

The technical solutions in the embodiments of the present application are clearly and completely described below with reference to the accompanying drawings in the embodiments of the present application. Obviously, the described embodiments are a part of the embodiments of the present application, rather than all the embodiments.

Compared with a semiconductor laser, a divergence angle of a Micro LED is larger. At present, there are no mature schemes for coupling a Micro LED array to an optical fiber in the industry. Therefore, it is necessary to seek an optical coupling structure to improve an optical coupling efficiency.

Figure 1:
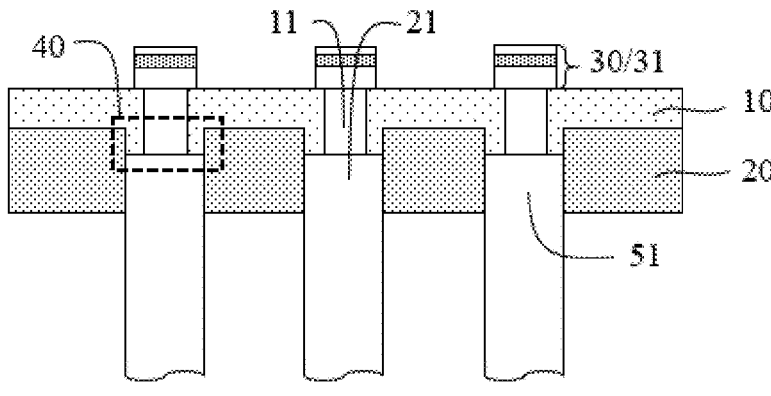
FIG. 1 is a schematic diagram of an optical coupling structure according to an embodiment of the present application.
Figure 2:
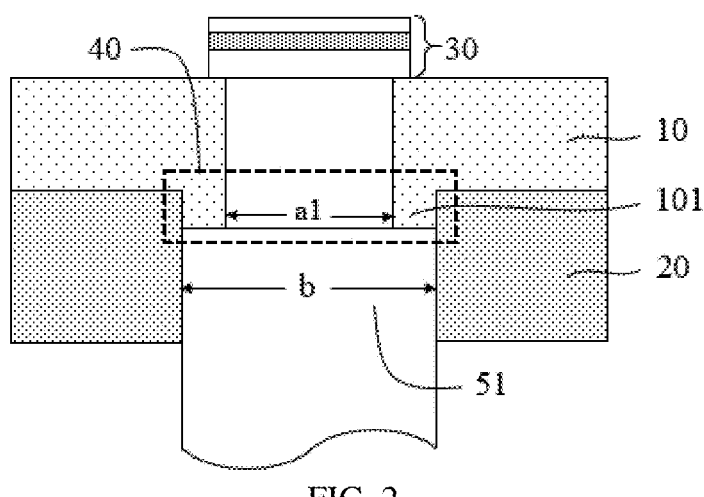
FIG. 2 is an enlarged schematic diagram of the embedding structure in FIG. 1.

In order to solve the above problems, the present application provides an optical coupling structure. FIG. 1 is a schematic diagram of an optical coupling structure according to an embodiment of this application. FIG. 2 is an enlarged schematic diagram of the embedding structure in FIG. 1. As shown in FIG. 1 and FIG. 2, the optical coupling structure includes an alignment layer 20, a growth substrate 10 and an optical functional layer 30 which are stacked sequentially. The growth substrate 10 is used for epitaxially manufacturing the optical functional layer 30. The growth substrate 10 is provided with a first through hole 11. The optical functional layer 30 is aligned with the first through hole 11. The alignment layer 20 is provided with a second through hole 21, and an optical fiber input end 51 is disposed in the second through hole 21. The optical coupling structure further includes an embedding structure 40, which is disposed at openings, facing each other, of the first through hole 11 and the second through hole 21, and a material surrounding one of the first through hole 11 and the second through hole 21 is embedded into the other of the first through hole 11 and the second through hole 21, so that the first through hole 11 and the second through hole 21 are connected in series, aligning the optical functional layer 30 with the optical fiber input end 51. The optical functional layer 30 may be light emitting functional layer, such as a light emitting epitaxial layer, used to emit a visible light signal; and the optical functional layer 30 may also be a photosensitive functional layer, such as a semiconductor photodiode, used to convert an optical signal into an electrical signal.

It should be noted that, as shown in FIG. 1 and FIG. 2, the optical fiber input end 51 is disposed in the second through hole 21 in the alignment layer 20. It may be understood that an optical fiber is aligned with the alignment layer 20 in advance, and then the alignment layer 20 is boned to the growth substrate 10 for manufacturing the optical functional layer 30, so as to prevent the optical functional layer 30 from being damaged when the optical fiber is bonded to the optical functional layer 30 at the later stage, and improve stability of the optical fiber input end in the optical coupling structure. The embedding structure 40 penetrates through the first through hole 11 and the second through hole 21, which may not only clamp and fix the growth substrate 10 and the alignment layer 20, effectively improving overall stability of the optical coupling structure, but also align the optical functional layer 30 with the optical fiber input end 51, and therefore, light emitting from the optical functional layer 30 directly enters the optical fiber input end 51 through the first through hole 11 and the second through hole 21, improving an optical coupling efficiency.

It should be noted that the embedding structure 40 may be a part of the growth substrate 10 located in the second through hole 21, so as to clamp the growth substrate 10 and the alignment layer 20, so that the optical function layer 30 is aligned with the optical fiber input end 51 through the first through hole 11 and the second through hole 21; and the embedding structure 40 may also be a part of the alignment layer 20 located in the first through hole 11, so as to clamp the growth substrate 10 and the alignment layer 20, so that the optical function layer 30 is aligned with the optical fiber input end 51 through the first through hole 11 and the second through hole 21.

In one embodiment, as shown in FIG. 2, the growth substrate 10 includes a substrate protrusion 101 protruding toward the second through hole 21 in the alignment layer 20, and the embedding structure 40 is formed by the substrate protrusion 101 and the second through hole 21. The substrate protrusion 101 protrudes from a surface of the alignment layer 20, and then the substrate protrusion 101 is extended into the second through hole 21 to clamp and fix the growth substrate 10 and the alignment layer 20, avoiding a relative movement between the growth substrate 10 and the alignment layer 20, and further effectively improving overall stability of the optical coupling structure.

In one embodiment, as shown in FIG. 2, along a direction parallel to a plane where the growth substrate 10 is located, a cross-sectional size al of the second through hole at the substrate protrusion 101 is less than a cross-sectional size b of the optical fiber input end 51. The cross-sectional size al of the second through hole at the substrate protrusion 101 is less than the cross-sectional size b of the optical fiber input end 51, so that a space for accommodating the optical fiber input end 51 is formed by the substrate protrusion 101 and the second through hole 21, and the optical fiber input end 51 is blocked by the substrate protrusion 101 to extend into the first through hole 11, preventing the optical fiber input end 51 from contacting the optical function layer 30, and further avoiding damage to the optical function layer 30.

It should be noted that, as shown in FIG. 2, along the direction parallel to the plane where the growth substrate 10 is located, the cross-sectional size b of the optical fiber input end 51 is equal to a cross-sectional size of the second through hole 21 at the other portion, except for the substrate protrusion 101, in the alignment layer 20. Optionally, the cross-sectional size b of the optical fiber input end 51 is slightly less than a cross-sectional size of the other portion, except for the substrate protrusion 101, of the second through hole 21, so that the optical fiber input end 51 is extended into the second through hole 21. At this time, an adhesive material may be filled between the optical fiber input end 51 and a sidewall of the alignment layer 20 to fix the optical fiber input end 51.

Figure 3:
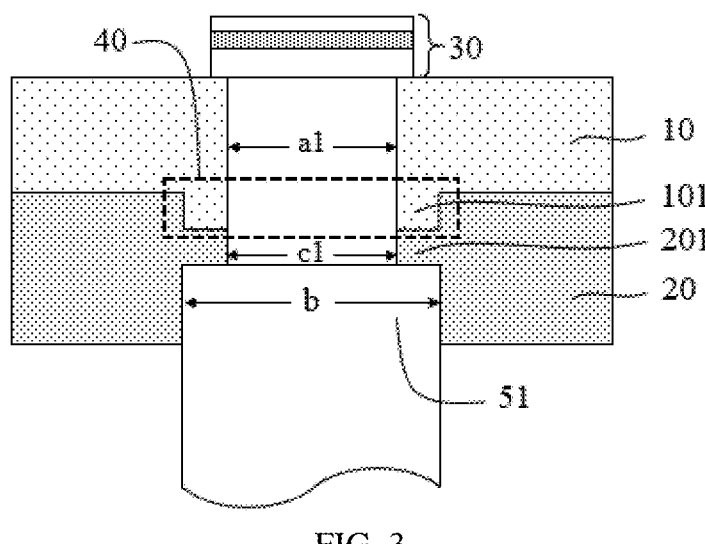
FIG. 3 is a schematic diagram of another embedding structure according to an embodiment of the present application.

In one embodiment, FIG. 3 is a schematic diagram of another embedding structure according to an embodiment of the present application, as shown in FIG. 3, the alignment layer 20 includes a first alignment layer protrusion 201 protruding radially toward the second through hole 21, and the first alignment layer protrusion 201 is located between the substrate protrusion 101 and the optical fiber input end 51. The first alignment layer protrusion 201 is located in the middle of the second through hole 21 in the alignment layer 20, and therefore, the space for accommodating the optical fiber input end 51 may be formed on a side, deviating from the growth substrate 10, of the alignment layer 20, and the space is used to fix the alignment layer 20 and the optical fiber in advance, reducing a possibility of damage to the optical function layer 30 due to excessive force during optical fiber fixation at the later stage. A space for accommodating the substrate protrusion 101 is formed on a side, close to the growth substrate 10, of the alignment layer 20 to clamp and fix the growth substrate 10 and the alignment layer 20, improving overall stability of the optical coupling structure. Along the direction parallel to the plane where the growth substrate 10 is located, a cross-sectional size c1 of the second through hole 21 at the first alignment layer protrusion 201 is less than the cross-sectional size b of the optical fiber input end 51.

Optionally, as shown in FIG. 3, for the convenience of manufacturing the substrate protrusion 101, along the direction parallel to the plane where the growth substrate 10 is located, the cross-sectional size c1 of the second through hole 21 at the first alignment layer protrusion 201 is equal to a cross-sectional size a1 of the first through hole 11. Optionally, along the direction parallel to the plane where the growth substrate 10 is located, the cross-sectional size c1 of the second through hole 21 at the first alignment layer protrusion 201 is less than or greater than the cross-sectional size a1 of the first through hole 11. A relative size between the cross-sectional size c1 and the cross-sectional size a1 is not limited in the embodiments of the present application.

Figure 4:
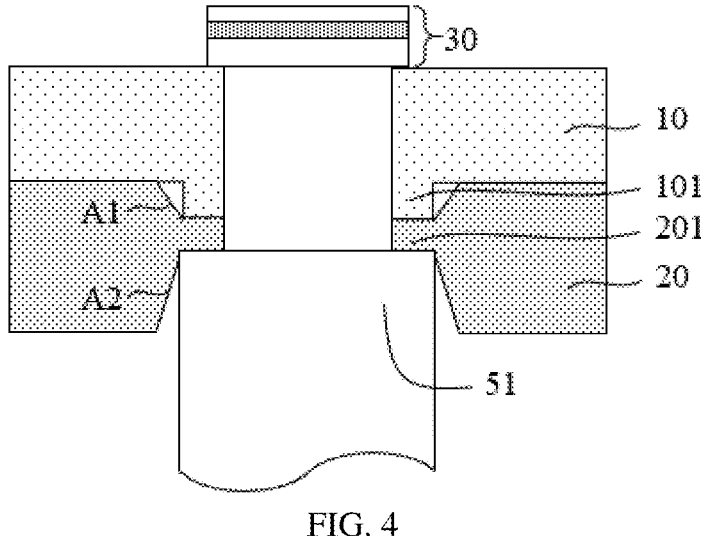
FIG. 4 is a schematic diagram of another embedding structure according to an embodiment of the present application.

In one embodiment, as shown in FIG. 4, a chamfer is provided at an opening, facing the growth substrate 10, of the second through hole 21 in the alignment layer 20 to form a first sidewall A1 constructed as an inclined plane; and a chamfer is provided at an opening, deviating from the growth substrate 10, of the second through hole 21 in the alignment layer 20 to form a second sidewall A2 constructed as an inclined plane. In other words, the first sidewall A1 is located between a surface, close to the growth substrate 10, of the first alignment layer protrusion 201 and an upper surface, close to the growth substrate 10, of the alignment layer 20. The first sidewall A1 is constructed as the inclined plane, so that the substrate protrusion 101 of the growth substrate 10 is easily extended into the second through hole 21 at the first sidewall A1, so as to facilitate alignment of the growth substrate 10 and the alignment layer 20. The second sidewall A2 is located between a surface, close to the optical fiber input end 51, of the first alignment layer protrusion 201 and a lower surface, close to the optical fiber input end 51, of the alignment layer 20. The second sidewall A2 is constructed as the inclined plane, so that the optical fiber input end 51 is easily extended into the second through hole 21 at the second sidewall A2, so as to facilitate alignment of the optical fiber input end 51 and the alignment layer 20.

FIG. 4 is a schematic diagram of another embedding structure according to an embodiment of the present application, as shown in FIG. 4, both the first sidewall A1 and the second sidewall A2 are inclined planes.

Optionally, in an optical coupling structure, the first sidewall A1 is an inclined plane, and the second sidewall A2 is perpendicular to the plane where the growth substrate 10 is located. Optionally, in an optical coupling structure, the first sidewall A1 is perpendicular to the plane where the growth substrate 10 is located, and the second sidewall A2 is an inclined plane.

Optionally, when the second sidewall A2 is an inclined plane, an adhesive material is filled between the optical fiber input end 51 and the second sidewall A2 to fix the optical fiber. Optionally, there is a gap between the first sidewall A1 and the substrate protrusion 101, so as to facilitate release of stress generated during bonding of the growth substrate 10 and the alignment layer 20.

Figure 5:
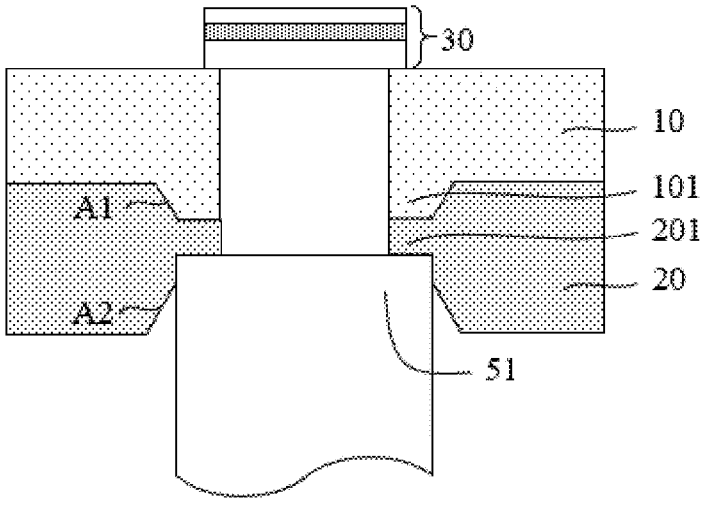
FIG. 5 is a schematic diagram of another embedding structure according to an embodiment of the present application.

Optionally, FIG. 5 is a schematic diagram of another embedding structure according to an embodiment of the present application, as shown in FIG. 5, at a side, close to the growth substrate 10, of the first alignment layer protrusion 201, a shape of a sidewall of the substrate protrusion 101 matches a shape of the first sidewall A1. Optionally, at a side, close to the optical fiber input end 51, of the first alignment layer protrusion 201, the second sidewall A2 is located at an opening end of the second through hole 21, there is a vertical sidewall between the second sidewall A2 and a surface, close to the optical fiber input end 51, of the first alignment layer protrusion 201, and the vertical sidewall matches a shape of the optical fiber input end 51, and therefore, the presence of the vertical sidewall facilitates fixation of the optical fiber input end 51.

Figure 6:
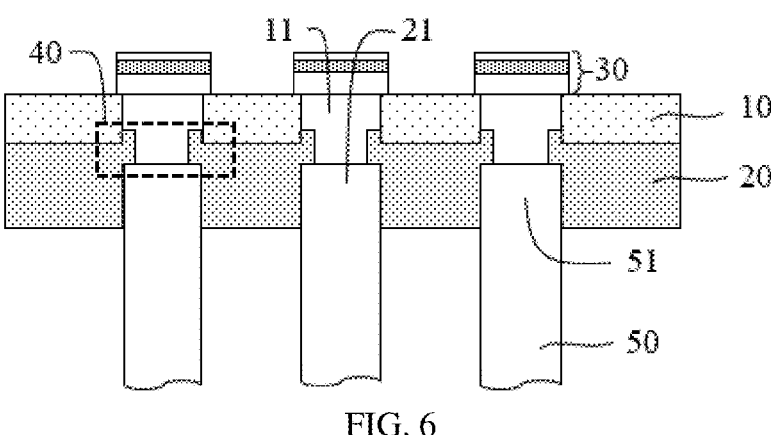
FIG. 6 is a schematic diagram of another optical coupling structure according to an embodiment of the present application.
Figure 7:
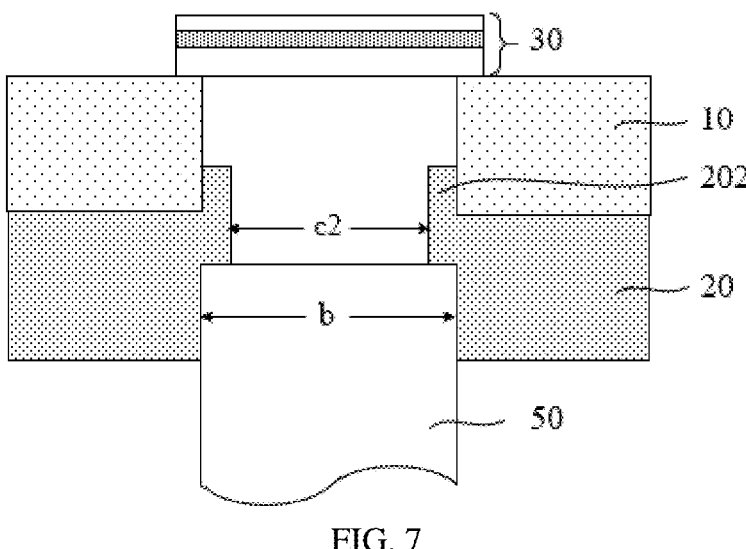
FIG. 7 is an enlarged schematic diagram of the embedding structure in FIG. 6.

In one embodiment, FIG. 6 is a schematic diagram of another optical coupling structure according to an embodiment of the present application, and FIG. 7 is an enlarged schematic diagram of the embedding structure in FIG. 6, as shown in FIG. 6 and FIG. 7, the alignment layer 20 includes a second alignment layer protrusion 202 protruding toward the first through hole 11 in the growth substrate 10, the embedding structure 40 is formed by the second alignment layer protrusion 202 and the first through hole 11, the optical fiber input end 51 is located on a side, away from the growth substrate 10, of the second alignment layer protrusion 202, and along the direction parallel to the plane where the growth substrate 10 is located, a cross-sectional size c2 of the second through hole 21 at the second alignment layer protrusion 202 is less than a cross-sectional size b of the optical fiber input end 51. The second alignment layer protrusion 202 protrudes toward the first through hole 11 in the growth substrate 10 to form the embedding structure 40, and the embedding structure 40 may be used to clamp and fix the growth substrate 10 and the alignment layer 20, effectively improving overall stability of the optical coupling structure.

Optionally, as shown in FIG. 7, the second alignment layer protrusion 202 further protrudes toward the second through hole 21 in the alignment layer 20, so as to form a space for accommodating the optical fiber input end 51; and along the direction parallel to the plane where the growth substrate 10 is located, the cross-sectional size c2 of the second through hole 21 at the second alignment layer protrusion 202 is less than the cross-sectional size b of the optical fiber input end 51, so that the optical fiber input end 51 is blocked by the second alignment layer protrusion 202 to extend into the first through hole 11, preventing the optical fiber input end 51 from contacting the optical function layer 30.

Figure 8:
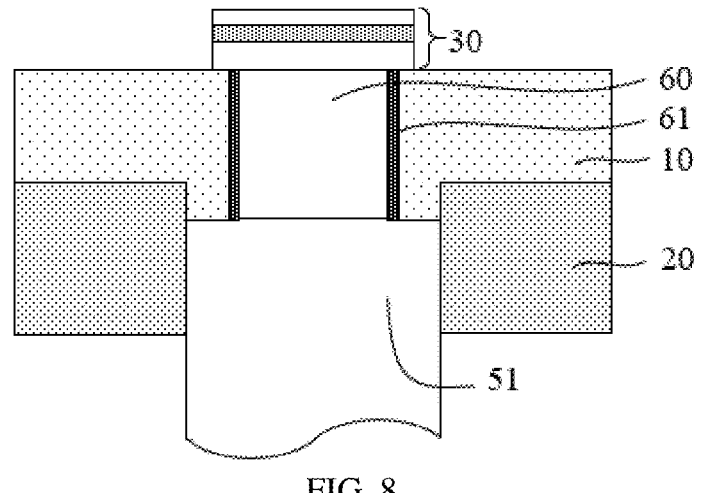
FIG. 8 is a schematic diagram of another embedding structure according to an embodiment of the present application.

FIG. 8 is a schematic diagram of another optical coupling structure according to an embodiment of the present application. As shown in FIG. 8, there is a gap 60 between the optical functional layer 30 and the optical fiber input end 51, i.e., the first through hole 11 between the optical functional layer 30 and the optical fiber input end 51 is not filled, but serves as an air gap.

In one embodiment, an optical film is disposed in the gap 60, and a refractive index of the optical film is between a refractive index of a semiconductor film layer, close to the growth substrate 10, in the optical functional layer 30 and a refractive index of the optical fiber input end 51. The refractive indexes of the optical film, the semiconductor film layer and the optical fiber input end 51 are gradual, and therefore, when an optical signal from the optical functional layer 30 enters the optical fiber through the optical film, the semiconductor film layer and the optical fiber input end 51, a light loss may be reduced, improving a coupling efficiency.

Optionally, the refractive index of the optical film is gradual. Optionally, by taking the optical functional layer 30 made of a GaN-based material as an example, the semiconductor film layer, close to the growth substrate 10, in the optical functional layer 30 is a nucleation layer made of AlN, a refractive index of AlN is 2.1, a material of the optical fiber input end 51 is $SiO_2$, a refractive index of $SiO_2$ is 1.45, and the refractive index of the optical film is between 1.45 and 2.1. Optionally, a material of the optical film is SiON, and different refractive indexes are adjusted by controlling a nitrogen content or an oxygen content of SiON, so as to obtain an optical film with a specific refractive index or a gradient refractive index.

In one embodiment, a reflective layer 61 is disposed on a sidewall of one of the first through hole 11 and the second through hole 21 which are corresponding to the gap 60. Specifically, as shown in FIG. 8, the reflective layer 61 is disposed on the sidewall of the first through hole 11 corresponding to the gap 60, light emitted from the optical functional layer 30 is reflected by the reflective layer 61 and then enters the optical fiber input end 51, and the presence of the reflective layer 61 prevents the light from being absorbed by the growth substrate 10 or the alignment layer 20. Optionally, the first through hole 11 and the second through hole 21 are both covered by the reflective layer 61.

Figure 9:
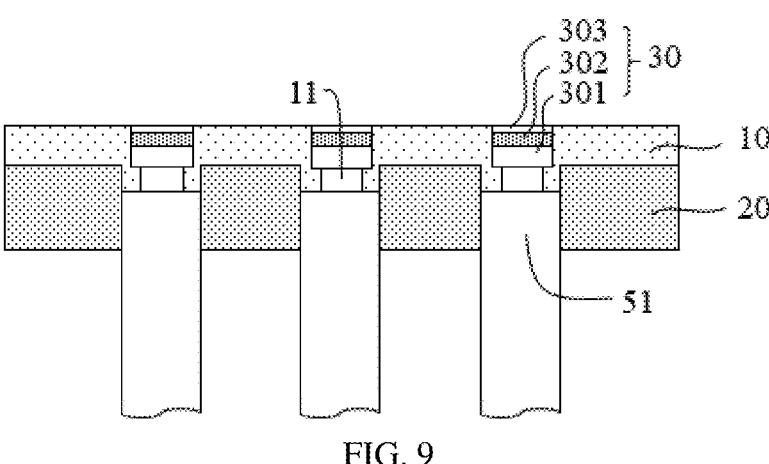
FIG. 9 is a schematic diagram of another optical coupling structure according to an embodiment of the present application.

FIG. 9 is a schematic diagram of another optical coupling structure according to an embodiment of the present application. As shown in FIG. 9, at least a part of the optical functional layer 30 is in the first through hole 11. The optical functional layer 30 includes an N-type semiconductor layer 301, an active layer 302 and a P-type semiconductor layer 303 which are stacked sequentially, and the N-type semiconductor layer 301, the active layer 302 and the P-type semiconductor layer 303 are all located in the first through hole 11. Optionally, only the N-type semiconductor layer 301 in the optical function layer 30 is located in the first through hole 11, or the N-type semiconductor layer 301 and the active layer 302 in the optical function layer 30 are located in the first through hole 11. It may be understood that the growth substrate 10 is a patterned structure having a groove, and the at least a part of the optical functional layer 30 is epitaxially formed in the groove of the growth substrate 10. It should be noted that a distance is maintained between the optical functional layer 30 and the optical fiber input end 51.

Optionally, before the optical functional layer 30 is epitaxially formed on the growth substrate 10, a nucleation layer, a buffer layer, and the like (not shown in Figs) are first formed.

Figure 10:
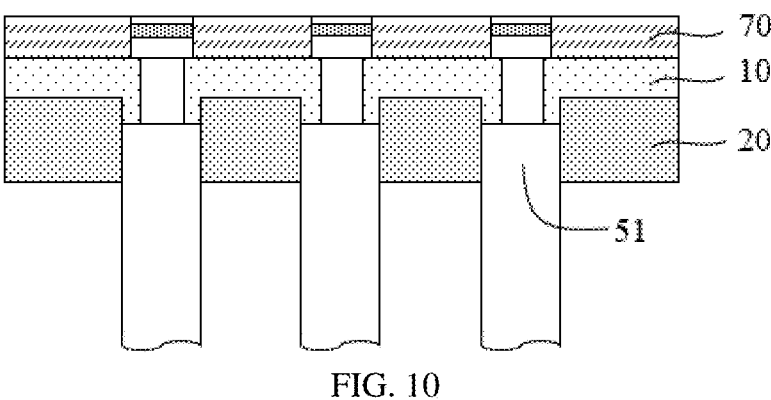
FIG. 10 is a schematic diagram of another optical coupling structure according to an embodiment of the present application.

FIG. 10 is a schematic diagram of another optical coupling structure according to an embodiment of the present application. As shown in FIG. 10, the optical coupling structure further includes an insulation structure 70 located between adjacent optical functional layers 30. The insulating structure 70 is made of opaque and insulating materials, which may also prevent light crosstalk between the adjacent optical functional layers 30.

Figure 11:
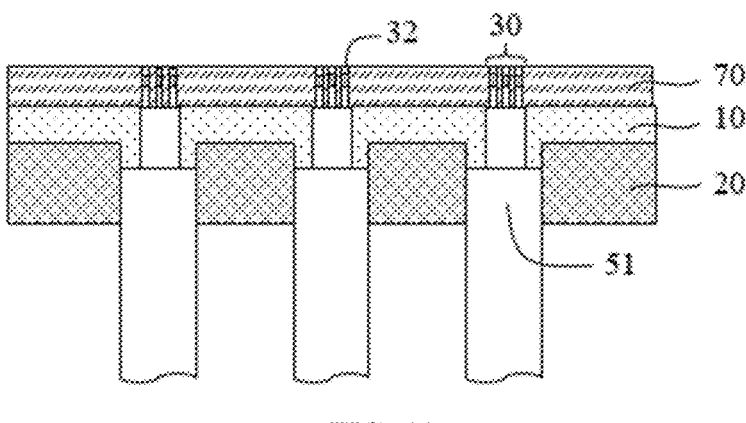
FIG. 11 is a schematic diagram of another optical coupling structure according to an embodiment of the present application.

In one embodiment, the optical function layer 30 corresponding to each optical fiber input end 51 includes a light emitting unit 31 (shown in FIG. 1). FIG. 11 is a schematic diagram of another optical coupling structure according to an embodiment of the present application. As shown in FIG. 11, the optical function layer 30 corresponding to each optical fiber input end 51 includes a plurality of light emitting units 32.

As shown in FIG. 1, in one embodiment, along the direction parallel to the plane where the growth substrate 10 is located, a cross-sectional size of the light emitting unit 31 is greater than 2 μm. Optionally, when the optical function layer 30 corresponding to each optical fiber input end 51 includes one light emitting unit 31, along the direction parallel to the plane where the growth substrate 10 is located, the cross-sectional size of each light emitting unit 31 is greater than 5 μm. As shown in FIG. 11, in another embodiment, when the optical functional layer 30 corresponding to each optical fiber input end 51 includes the plurality of light emitting units 32, along the direction parallel to the plane where the growth substrate 10 is located, the cross-sectional size of each light emitting unit 32 ranges from 2 μm to 10 μm. Optionally, the light emitting unit 31 or the light emitting unit 32 is matched as a Micro-LED unit.

In one embodiment, a material of the growth substrate 10 is one of or a combination of Si, SiGe, SiC, GaN, AlN or sapphire. When the material of the growth substrate 10 is Si, the first through hole 11 is formed by an opaque sidewall made of silicon, which is conducive to limit light being coupled to the optical fiber input end 51.

In one embodiment, a material of the alignment layer 20 is the same as a material of the growth substrate 10, which facilitates bonding of the alignment layer 20 and the growth substrate 10. Optionally, a material of the alignment layer 20 and a material of the growth substrate 10 are different, for example, the material of the growth substrate 10 is Si, but the material of the alignment layer 20 is $SiO_2$, and a person skilled in the art may use a suitable material according to actual requirements.

In one embodiment, a material of the optical functional layer 30 is a group III-V semiconductor material. Optionally, as shown in FIG. 9, taking the optical functional layer 30 made of a GaN-based material as an example, the optical functional layer 30 includes an N-type semiconductor layer 301, an active layer 302 and a P-type semiconductor layer 303, the N-type semiconductor layer 301 and the P-type semiconductor layer 303 are made of GaN, and the active layer 302 is a multi-quantum well layer made of GaN and one of or a combination of InGaN, AlGaN or AlInGaN. Light in any wavelength in a visible light region may be generated by the GaN-based material, which expands an application scenario of the optical coupling structure. Optionally, the optical functional layer 30 is made of a GaAs-based material.

In one embodiment, along a direction perpendicular to the plane where the growth substrate 10 is located, a thickness of the growth substrate 10 ranges from 5 μm to 150 μm. Optionally, the thickness of the growth substrate 10 is any one of 20 μm, 50 μm, 70 μm, 100 μm and 150 μm.

In one embodiment, along the direction perpendicular to the plane where the growth substrate 10 is located, a thickness of the alignment layer 20 is greater than or equal to 50 μm, so as to improve stability of the optical fiber input end 51 in the optical coupling structure. Optionally, the thickness of the alignment layer 20 is any one of 50 μm, 100 μm, 200 μm and 500 μm.

Figure 12:
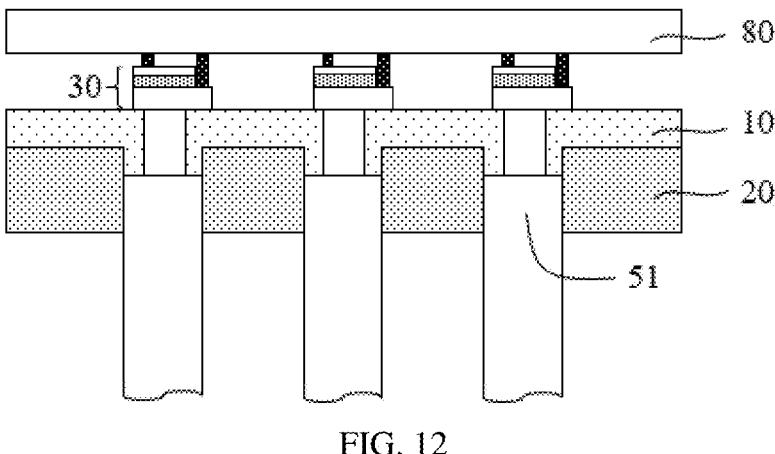
FIG. 12 is a schematic diagram of another optical coupling structure according to an embodiment of the present application.

In one embodiment, FIG. 12 is a schematic diagram of another optical coupling structure according to an embodiment of the present application, as shown in FIG. 12, the optical coupling structure further includes a driving substrate 80 located on a side, away from the alignment layer 20, of the optical functional layer 30. The optical functional layer 30 is provided with a driving signal by the driving substrate 80, and an electrical connection between the optical functional layer 30 and the driving substrate 80 is not limited.

Figure 13:
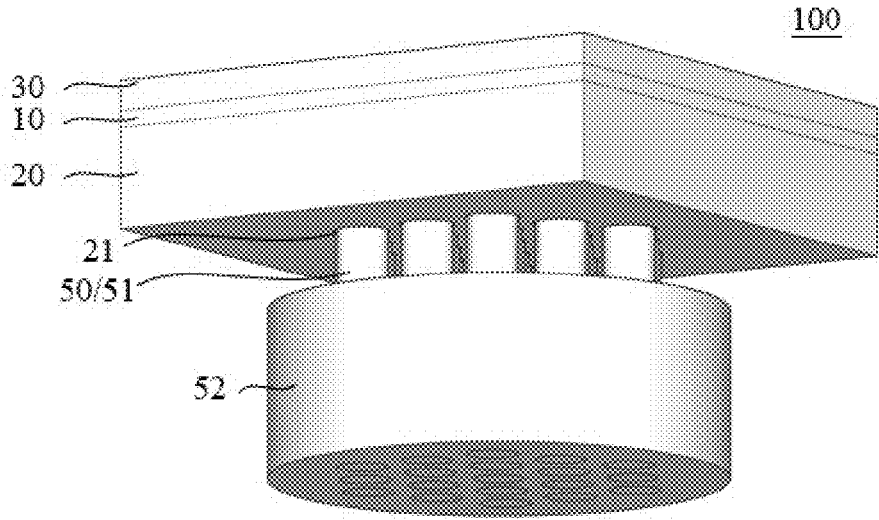
FIG. 13 is a three-dimensional schematic structural diagram of another optical coupling structure according to an embodiment of the present application.
Figure 14:
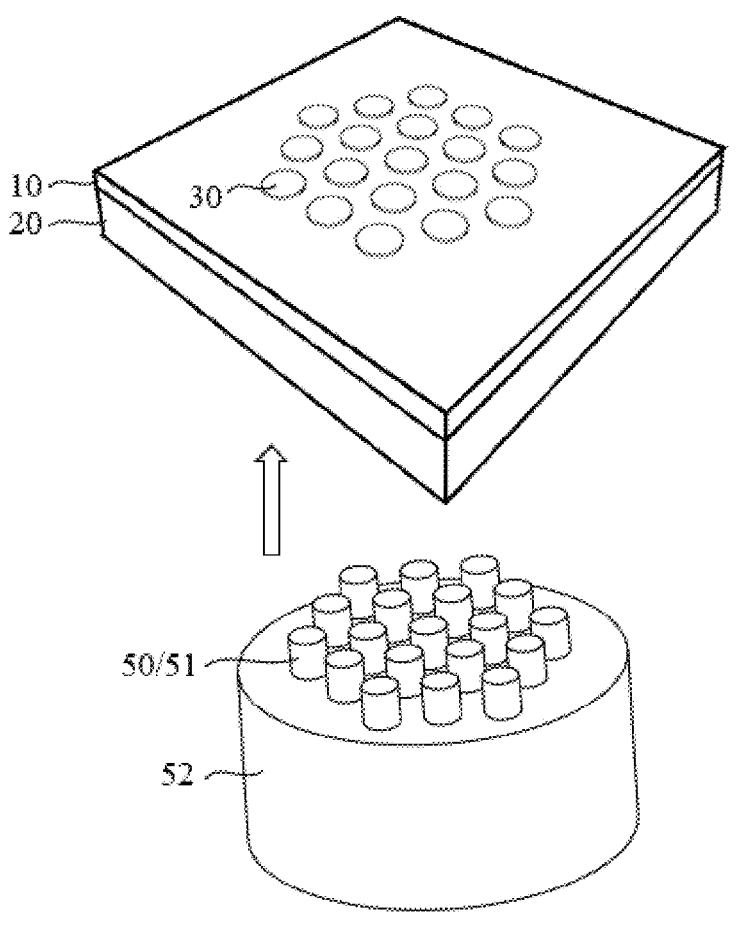
FIG. 14 is a three-dimensional schematic structural diagram of the optical coupling structure in FIG. 13 before being clamped.

In one embodiment, FIG. 13 is a three-dimensional schematic structural diagram of another optical coupling structure according to an embodiment of the present application, and FIG. 14 is a three-dimensional schematic structural diagram of the optical coupling structure in FIG. 13 before being clamped, as shown in FIG. 13 and FIG. 14, there is at least one optical coupling unit 100, the optical coupling unit 100 includes N optical functional layers 30 and N optical fiber cores 50, and each optical fiber core 50 includes the optical fiber input end 51 corresponding to the optical functional layer 30. The N optical fiber cores 50 are wrapped by one coating layer 52, and the optical fiber input end 51 protrudes beyond the coating layer 52, N is an integer greater than 0, a number of N in the embodiment of the present application is not limited. The N optical fiber input ends 51 are exposed outside of the coating layer 52, and are inserted into the N second through holes 21 in the alignment layer 20, and finally the N optical fiber input ends 51 and the N optical functional layers 30 are in a one-to-one correspondence.

For example, the optical coupling unit 100 corresponds to one multi-core optical fiber. The multi-core optical fiber is a single-mode optical fiber, for example, in one optical coupling unit 100, light emitting from the N optical functional layers 30 have the same wavelength range, and the optical fiber cores of the multi-core optical fiber transmit light in the same wavelength range; or the multi-core optical fiber is a multi-mode optical fiber, for example, in one optical coupling unit 100, light emitting from the N optical functional layers 30 have different wavelength ranges, and the optical fiber cores of the multi-core optical fiber correspondingly transmit light in different wavelength ranges.

Optionally, as shown in FIG. 13 and FIG. 14, one optical coupling unit 100 includes nineteen optical fiber cores 50 and nineteen optical functional layers 30.

Optionally, as shown in FIG. 3, before the optical fiber input end 51 is completely inserted into the second through hole 21, an end surface of the coating layer 52 is not in contact with a bottom surface of the alignment layer 20. The optical fiber input end 51 is completely inserted into the second through hole 21 in the alignment layer 20, and the coating layer 52 is in direct contact with the alignment layer 20, so as to prevent the optical fiber core 50 from being broken due to excessive exposure of the optical fiber core 50.

It should be noted that, as shown in FIG. 13, the optical functional layer 30 is shown as a whole layer.

FIG. 15 is a schematic diagram of another optical coupling structure according to an embodiment of the present application. As shown in FIG. 15, an optical fiber of the optical coupling structure is a single-core optical fiber, one optical coupling structure includes three optical fiber cores 50 and three optical functional layers 30, and each optical fiber core 50 is wrapped by one coating layer 52.

An embodiment of the present application further provides a method for manufacturing an optical coupling structure. FIG. 16 is a flowchart of a method for manufacturing an optical coupling structure according to an embodiment of the present application. FIG. 17 to FIG. 21 are schematic diagrams of intermediate structures generated during a process of manufacturing an optical coupling structure according to an embodiment of the present application. As shown in FIG. 16, the method for manufacturing the optical coupling structure includes the following steps.

Figure 17:
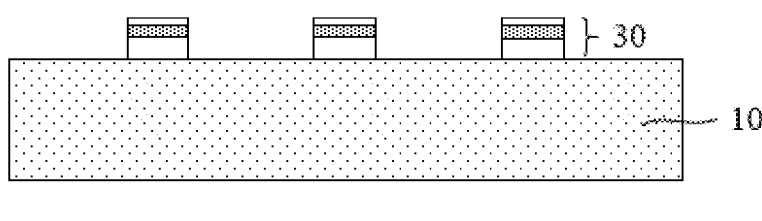
FIG. 17 to FIG. 21 are schematic diagrams of intermediate structures generated during a process of manufacturing an optical coupling structure according to an embodiment of the present application.
Figure 18:
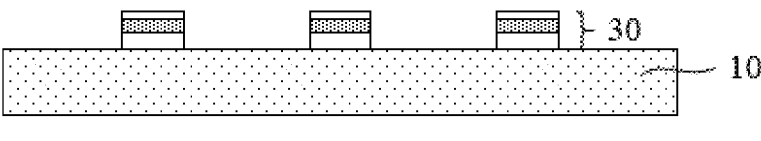

Step S1, as shown in FIG. 17 and FIG. 18, epitaxially forming an optical functional layer 30 on a side of a growth substrate 10, and thinning the other side of the growth substrate 10. I.e., a side, away from the optical function layer 30, of the growth substrate 10 is thinned. Optionally, a plurality of optical function layers 30 are formed by the patterned growth substrate 10, or after the growth substrate 10 is formed by a whole layer, the growth substrate 10 is then regionally etched to form the plurality of optical function layers 30. Optionally, a thickness of the growth substrate 10 is reduced to 5 μm to 100 μm.

Figure 19:
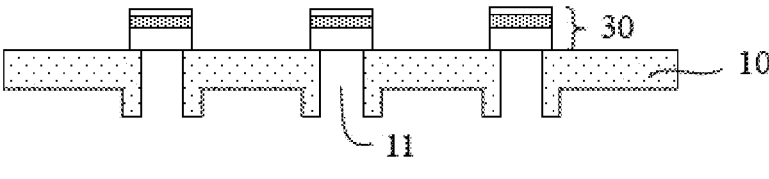

Step S2, as shown in FIG. 19, etching the growth substrate 10 from a side, away from the optical functional layer 30, of the growth substrate 10 to form a first through hole 11 and expose the optical functional layer 30.

Figure 20:
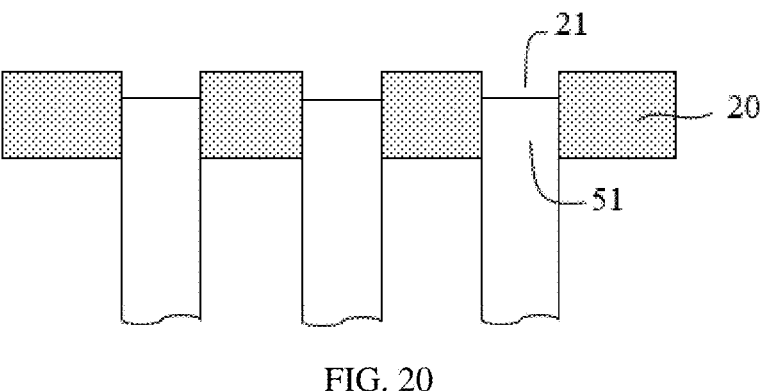

Step S3, as shown in FIG. 20, etching an alignment layer 20 to form a second through hole 21, and disposing an optical fiber input end 51 in the second through hole 21. Optionally, the manner in which the optical fiber input end 51 is fixed in the alignment layer 20 is not limited.

Figure 21:
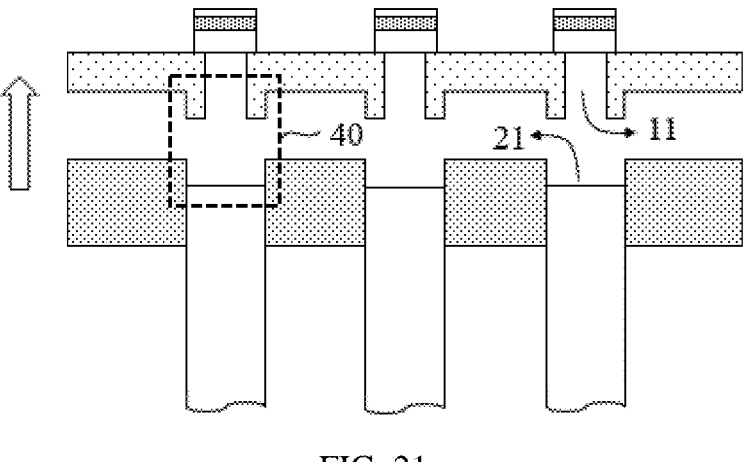

Step S4, as shown in FIG. 21, bonding the growth substrate 10 and the alignment layer 20 to form an embedding structure 40, and the embedding structure 40 penetrating through the first through hole 11 and the second through hole 21, aligning the optical functional layer 30 with the optical fiber input end 51. The embedding structure 40 is located at a junction of the first through hole 11 and the second through hole 21, and the embedding structure 40 aligns and penetrates through the first through hole 11 and the second through hole 21, so that the optical functional layer 30 is aligned with the optical fiber input end 51, so as to finally obtain the optical coupling structure shown in FIG. 1.

In the method for manufacturing the optical coupling structure provided in the embodiments, the optical fiber input end 51 is aligned with the alignment layer 20 in advance, and then the alignment layer 20 is boned to the growth substrate 10 for manufacturing the optical functional layer 30, so as to prevent the optical functional layer 30 from being damaged when the optical fiber is bonded to the optical functional layer 30 at the later stage, and improve stability of the optical fiber input end 51 in the optical coupling structure. The embedding structure 40 at the junction of the first through hole 11 and the second through hole 21 is used for aligning and penetrating through the first through hole 11 and the second through hole 21, which may not only clamp the growth substrate 10 and the alignment layer 20, effectively improving overall stability of the optical coupling structure, but also align the optical functional layer 30 with the first through hole 11 and the second through hole 21, and therefore, light emitting from the optical functional layer 30 directly enters the optical fiber input end 51 through the first through hole 11 and the second through hole 21, improving an optical coupling efficiency.

Figure 22:
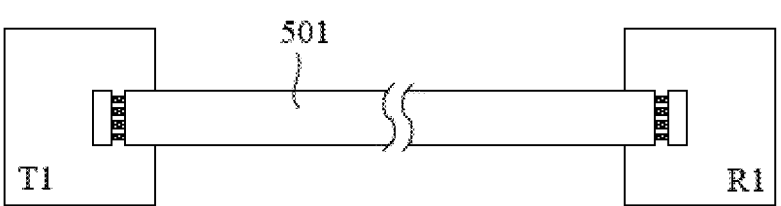
FIG. 22 is a schematic diagram of an optical communication system according to an embodiment of the present application.

An embodiment of the present application further provides an optical communication system, including an optical coupling structure in the embodiments described above. FIG. 22 is a schematic diagram of an optical communication system according to an embodiment of the present application, as shown in FIG. 22, the optical communication system includes an optical coupling structure located at a transmitting end T1, information, in a form of light waves, are coupled to an optical fiber 501 through the optical coupling structure and then coupled to a receiving end R1 through the optical fiber 501.

Embodiments of the present application provide an optical coupling structure and a method for manufacturing the same, and an optical communication system. The optical coupling structure includes an alignment layer, a growth substrate and an optical functional layer which are stacked sequentially, the growth substrate is used for epitaxially manufacturing the optical functional layer, the growth substrate includes a first through hole, the optical functional layer is aligned with the first through hole, the alignment layer includes a second through hole, and the second through hole is used to dispose an optical fiber input end for improving stability of the optical fiber input end in the optical coupling structure; and the optical coupling structure further includes an embedding structure used to penetrate through the first through hole and the second through hole, which may not only clamp and fix the alignment layer and the growth substrate, effectively improving overall stability of the optical coupling structure, but also align the optical functional layer with the optical fiber input end, and therefore, light emitting from the optical functional layer directly enters the optical fiber input end through the first through hole and the second through hole, improving an optical coupling efficiency.

It is to be appreciated that the term "including" and variations thereof used in the present application are open-ended, i.e. "including but not limited to". The term "one embodiment" means "at least one embodiment"; and the term "another embodiment" means "at least one additional embodiment". In the specification, the specific features, structures, materials or characteristics described may be combined in a suitable manner in any one or more embodiments or examples. In addition, without contradicting each other, a person skilled in the art may combine and constitute different embodiments or examples, and the features in different embodiments or examples described in this specification.

What is claimed is:

1. An optical coupling structure, comprising:

an alignment layer, a growth substrate and an optical functional layer which are stacked sequentially, the growth substrate being used for epitaxially manufacturing the optical functional layer, the growth substrate comprising a first through hole, the optical functional layer being aligned with the first through hole, and the alignment layer comprising a second through hole;

an optical fiber input end disposed in the second through hole; and an embedding structure disposed at openings, facing each other, of the first through hole and the second through hole, and a material surrounding one of the first through hole and the second through hole being embedded into the other of the first through hole and the second through hole, connecting the first through hole and the second through hole in series.

2. The optical coupling structure according to claim 1, wherein the growth substrate comprises a substrate protrusion protruding toward the second through hole in the alignment layer, and the substrate protrusion is embedded into the second through hole to form the embedding structure.

3. The optical coupling structure according to claim 2, wherein along a direction parallel to a plane where the growth substrate is located, a cross-sectional size of the second through hole at the substrate protrusion is less than a cross-sectional size of the optical fiber input end.

4. The optical coupling structure according to claim 2, wherein the alignment layer comprises a first alignment layer protrusion protruding radially toward the second through hole, and the first alignment layer protrusion is located between the substrate protrusion and the optical fiber input end.

5. The optical coupling structure according to claim 4, wherein a chamfer is provided at an opening, facing the growth substrate, of the second through hole in the alignment layer to form a first sidewall constructed as an inclined plane; and/or, a chamfer is provided at an opening, deviating from the growth substrate, of the second through hole in the alignment layer to form a second sidewall constructed as an inclined plane.

6. The optical coupling structure according to claim 1, wherein the alignment layer comprises a second alignment layer protrusion protruding toward the first through hole in the growth substrate along an axis of the second through hole, and the embedding structure is formed by the second alignment layer protrusion and the first through hole, the optical fiber input end is located on a side, away from the growth substrate, of the second alignment layer protrusion, and along a direction parallel to a plane where the growth substrate is located, a cross-sectional size of the second through hole at the second alignment layer protrusion is less than a cross-sectional size of the optical fiber input end.

7. The optical coupling structure according to claim 1, wherein there is a gap between the optical functional layer and the optical fiber input end.

8. The optical coupling structure according to claim 7, wherein an optical film is disposed in the gap, and a refractive index of the optical film is between a refractive index of a semiconductor film layer, close to the growth substrate, in the optical functional layer and a refractive index of the optical fiber input end.

9. The optical coupling structure according to claim 7, wherein a reflective layer is disposed on a sidewall of one of the first through hole and the second through hole which are corresponding to the gap.

10. The optical coupling structure according to claim 1, wherein at least a part of the optical functional layer is in the first through hole.

11. The optical coupling structure according to claim 1, wherein the optical functional layer corresponding to each optical fiber input end comprises a light emitting unit or a photosensitive unit, or, the optical functional layer corresponding to each optical fiber input end comprises a plurality of light emitting units or a plurality of photosensitive units.

12. The optical coupling structure according to claim 11, wherein along a direction parallel to a plane where the growth substrate is located, a cross-sectional size of the light emitting unit is greater than 2 μm.

13. The optical coupling structure according to claim 1, wherein there is at least one optical coupling unit, each optical coupling unit comprises N optical functional layers and N optical fiber cores, and each optical fiber core comprises the optical fiber input end corresponding to the optical functional layer, and each optical fiber core is wrapped by a coating layer, the optical fiber input end protrudes beyond the coating layer, and N is an integer greater than 0.

14. The optical coupling structure according to claim 1, wherein a material of the growth substrate is one of or a combination of Si, SiGe, SiC, GaN, AlN or sapphire.

15. The optical coupling structure according to claim 1, wherein a material of the optical functional layer is a group III-V semiconductor material.

16. The optical coupling structure according to claim 1, wherein a thickness of the growth substrate ranges from 5 μm to 150 μm.

17. The optical coupling structure according to claim 1, wherein a thickness of the alignment layer is greater than or equal to 50 μm.

18. The optical coupling structure according to claim 1, further comprising:

a driving substrate located on a side, away from the alignment layer, of the optical functional layer.

19. A method for manufacturing an optical coupling structure, comprising:

epitaxially forming an optical functional layer on a side of a growth substrate, and thinning the other side of the growth substrate;

etching the growth substrate from a side, away from the optical functional layer, of the growth substrate to form a first through hole and expose the optical functional layer;

etching an alignment layer to form a second through hole, and disposing an optical fiber input end in the second through hole; and bonding the growth substrate and the alignment layer to form an embedding structure, and the embedding structure penetrating through the first through hole and the second through hole, aligning the optical functional layer with the optical fiber input end.

20. An optical communication system, comprising an optical coupling structure, wherein the optical coupling structure comprises:

an alignment layer, a growth substrate and an optical functional layer which are stacked sequentially, the growth substrate being used for epitaxially manufacturing the optical functional layer, the growth substrate comprising a first through hole, the optical functional layer being aligned with the first through hole, and the alignment layer comprising a second through hole;

an optical fiber input end disposed in the second through hole; and an embedding structure disposed at openings, facing each other, of the first through hole and the second through hole, and a material surrounding one of the first through hole and the second through hole being embedded into the other of the first through hole and the second through hole, connecting the first through hole and the second through hole in series.

* * * * *